US006563451B1

United States Patent
Krikorian et al.

(10) Patent No.: US 6,563,451 B1
(45) Date of Patent: May 13, 2003

(54) RADAR IMAGING SYSTEM AND METHOD

(75) Inventors: Kapriel V. Krikorian, Oak Park, CA (US); Robert A. Rosen, Agoura Hills, CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 10/050,296

(22) Filed: Jan. 16, 2002

(51) Int. Cl.$^7$ .............................................. G01S 13/00
(52) U.S. Cl. .......................... 342/25; 342/159; 342/195
(58) Field of Search .......................... 342/25, 158, 159, 342/195

(56) References Cited

U.S. PATENT DOCUMENTS

| | | | | |
|---|---|---|---|---|
| 4,978,960 A | * | 12/1990 | Newcomb et al. | 342/191 |
| 4,989,008 A | * | 1/1991 | Fujisaka et al. | 342/191 |
| 6,111,535 A | * | 8/2000 | Smith | 342/159 |
| 6,163,293 A | * | 12/2000 | Sezai | 342/196 |

* cited by examiner

Primary Examiner—Thomas H. Tarcza
Assistant Examiner—Brian Andrea
(74) Attorney, Agent, or Firm—Leonard A. Alkov; Glenn H. Lenzen, Jr.

(57) ABSTRACT

An imaging processing system and method. In accordance with the invention, the illustrative method includes the steps of providing a transfer function between scene excitations and voltage returns based on geometry, beam pattern and/or scan rate; ascertaining a set of scene excitations that minimize a penalty function of the transfer function; and ascertaining a set of scene intensities based on the scene excitations, and a set of optimal weights for the penalty function based on the scene reflectivities. The inventive method provides significantly enhanced image sharpening. In the illustrative embodiment, the inventive method uses an iterative convergence technique which minimizes a penalty function of the sum of square errors between the scene excitations corrupted by the radar system (i.e. the antenna pattern and processing) and the radar voltage returns. The innovation significantly enhances radar imagery by iteratively deriving a best scene solution, which reduces corruption introduced by the radar system. The novel technique for enhanced discrimination by the radar imagery is an iterative technique, which models the true scene signal corruption and derives a solution for the scene intensities, which minimizes the errors in the derived image. The novel technique finds the scene scatterer powers, which best match the original image pixel powers. The effect of the antenna pattern is taken into consideration when computing the derived image, which is matched against the original image. The constraint is implemented iteratively by adding a weighted sum of scene powers to the penalty function. The weights are adjusted at each iteration.

7 Claims, 3 Drawing Sheets rbgm IMAGE

SHARPENED rbgm IMAGE

RADAR IMAGING SYSTEM AND METHOD

BACKGROUND OF THE INVENTION

1. Field of the Invention

The present invention relates to imaging systems. More specifically, the present invention relates to radar imaging systems.

2. Description of the Related Art

Imaging techniques are well known and widely used in the art. Certain imaging technologies are better suited for particular applications. For example, radar imagery is widely used for surveillance and reconnaissance as well as target tracking and identification. For radar and other imaging technologies, the ability to clearly resolve and discriminate targets may be essential in meeting objectives specified for a particular application.

One such application involves 'real beam ground mapping'. Real beam ground mapping involves scanning an area, e.g., the earth's surface, using a scanning antenna or an electronically scanned antenna. Returns from an illumination of the surface are then examined for 'back-scatter' or reflections therefrom. As the beam is scanned in azimuth, information is collected with respect to the range direction. At each beam position, the distance of various scatterers may be ascertained for each range cell. This information may then be displayed in a real beam ground mapped image.

Unfortunately, while range data may be resolved with adequate resolution, currently, resolution of azimuth data with comparable resolution has proved to be problematic. This is due to the fact that azimuth resolution is limited to the width of the beam and degrades as a function of range. Accordingly, the poor resolution of conventional real beam mapping systems limits the ability of the system to discriminate scatterers.

SAR (synthetic aperture radar) has been used for ground mapping. However, currently, SARs require several seconds at each beam position and are therefore too slow for many more demanding (e.g., military) applications.

"Super resolution" techniques are widely used to sharpen the radar imagery. However, the quality achieved is scene dependent and is not robust. The current techniques do not effectively account for the impact of the radar system on the true scene.

Hence, a need remains in the art for an improved system or method for providing ground-mapped images. Specifically, a need remains in the art for a system or method for providing enhanced cross-range (azimuthal) resolution for a real beam ground mapping radar system.

SUMMARY OF THE INVENTION

The need in the art is addressed by the image processing system and method of the present invention. In an illustrative embodiment, the inventive system is implemented in software running on a processor. The software provides a transfer function between scene reflectivities and image intensities in image databased on geometry, beam pattern and/or scan rate. The software ascertains a set of scene intensities that minimize a penalty function of the transfer function. Further, the software ascertains an optimal set of weights for the scene reflectivities based on the weighted scene intensities for the image data.

In an illustrative application, the invention is incorporated into a radar system including: a transmitter for illuminating a target with a beam of electromagnetic energy, the beam scanning in a cross-range direction; a receiver for receiving reflections of the beam as return data and convolving the beam with the return data; and a processor responsive to the receiver for enhancing the target return in the cross-range direction.

In short, the inventive method provides a novel technique, which provides significantly enhanced image sharpening. In the illustrative embodiment, the inventive method uses an iterative convergence technique that minimizes a penalty function whose weights are updated at each stage of the iteration. The present invention provides a technique for significantly enhancing radar imagery by iteratively deriving a best scene solution that reduces corruption introduced by a radar system. The inventive technique models the true scene signal corruption and derives a solution for the scene intensities, which minimizes the errors in the derived image.

The novel technique finds the scene scatterer powers, which best match the original image pixel powers. The effect of the antenna pattern is taken into consideration when computing the derived image, which is matched against the original image. For example, for Real Beam Ground Maps the power PDId (post detection noncoherently integrated) pixel responses are considered with the given known smearing of the antenna. In the illustrative embodiment, the penalty function is the sum of square errors between the hypothesized scene excitation convolved with the antenna pattern and the radar voltage returns. The weights are adjusted on each iteration based on the updated estimates of the scene intensities.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
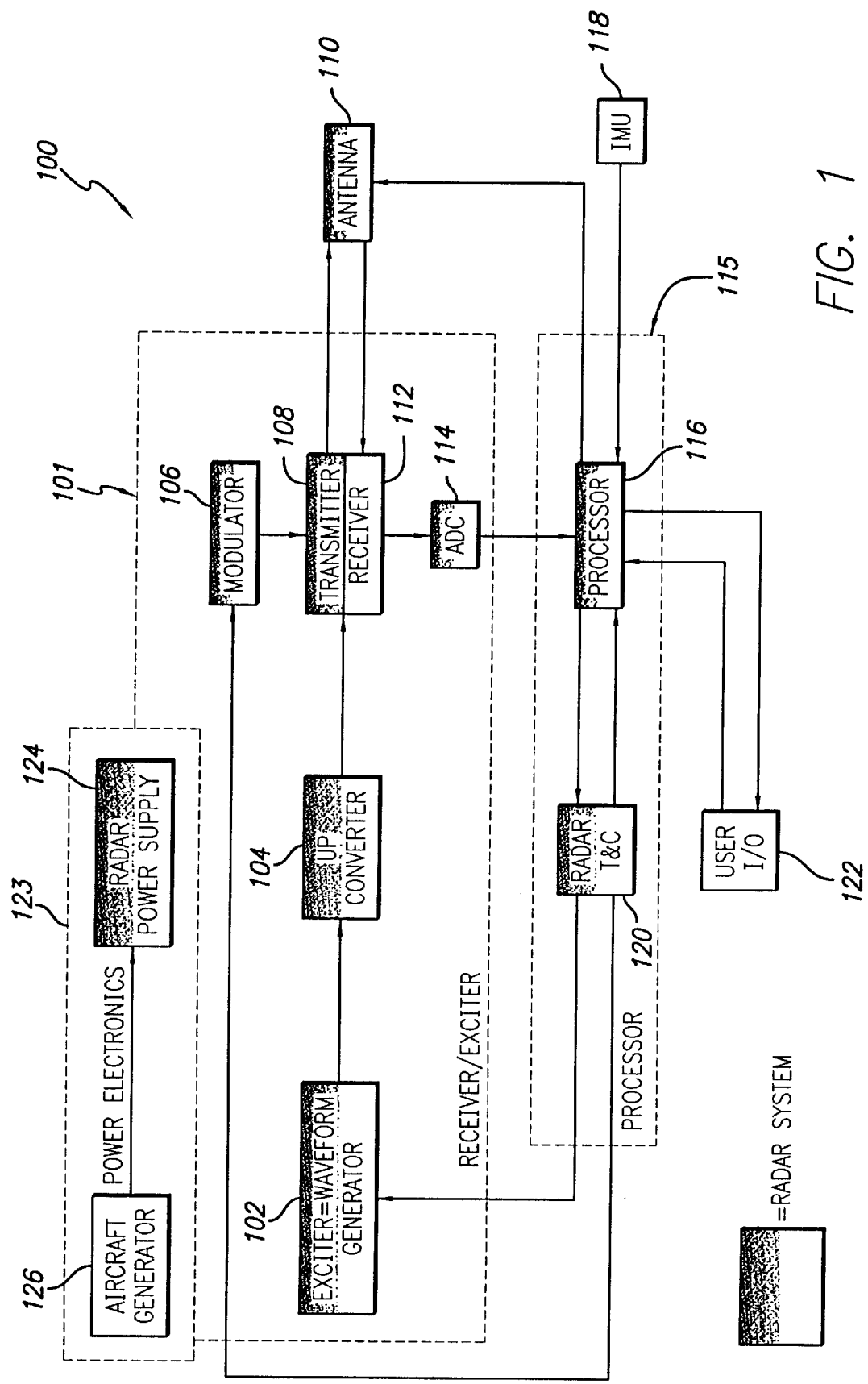
FIG. 1 is a generalized block diagram of a radar system implemented in accordance with the teachings of the present invention.

FIG. 1 is a generalized block diagram of a radar system implemented in accordance with the teachings of the present invention. Those skilled in the art will appreciate that although the present teachings are disclosed with reference to an illustrative radar system implementation, the invention is not limited thereto. The present teachings may be applied to a variety of image processing applications without departing from the scope thereof. The system 100 includes a receiver/exciter 101 of conventional design and construction. As is common in the art, the receiver/exciter 101 includes an exciter/waveform generator 102, which generates a radar waveform suitable for a given application. The radar signal is upconverted by an upconvert stage 104 and filtered, amplified and transmitted by a transmitter stage 108 in response to a reference signal from a modulator 106. The transmit signal is radiated by a radar antenna 110 as a beam of electromagnetic energy.

In an illustrative real beam ground mapping application, the antenna beam is scanned across the scene and scatter returns of the transmit beam as it is reflected from the ground or other surface are received by the antenna 110 and applied to a radar receiver stage 112. In accordance with the present teachings, the radar receiver 112 amplifies, filters and down converts the scatter return at each beam position in a conventional manner. The amplified, filtered and down converted scatter returns are digitized by an analog-to-digital converter stage 114 and fed to a processor 116 in a processor stage 115. As discussed more fully with reference to FIG. 2 below, in accordance with the present teachings, the processor 116 executes a program in software to sharpen the image in the cross-range direction. The output of the sharpening algorithm is a vector of estimated scene intensities across azimuth pixels at each range bin. The scene intensity vector is determined iteratively after an initial estimate, which is set equal to the PDId power recorded at each beam position for the range bin. Each stage of the iteration involves two steps. The first step is an estimation of the complex scene excitations. A separate scene excitation vector is generated for each independent RF. The elements of each scene excitation vector correspond to the azimuth pixels of the sharpened image. The estimated scene excitation vector is selected to minimize the penalty function:

$$P=(Ac-v)^+w(Ac-v) \qquad [1]$$

where
- v=complex voltage return vector over beam positions
- A=transfer function matrix relating the scene excitation vector to the beam voltages in the range bin
- w=diagonal matrix with each diagonal element equal to the inverse of the scene intensity estimate
- c=complex scene excitation vector.

The solution to the minimization of the penalty P may be expressed as:

$$c=(w+A^+A)\backslash A^+v \qquad [2]$$

Note that the products $A^+v$ and $A^+A$ do not change from stage to stage so they may be computed before the iteration.

The second step of each stage is an update of the estimated scene intensities. Each element of the scene intensity vector is set equal to the absolute square of the corresponding element of the excitation vector, averaged across RFs. As described above, the diagonal elements of the penalty weights W are then set equal to the inverse of the corresponding elements of the intensity vector.

Typically, ten iteration stages are required to converge on the sharpened intensity estimate.

Figure 2:
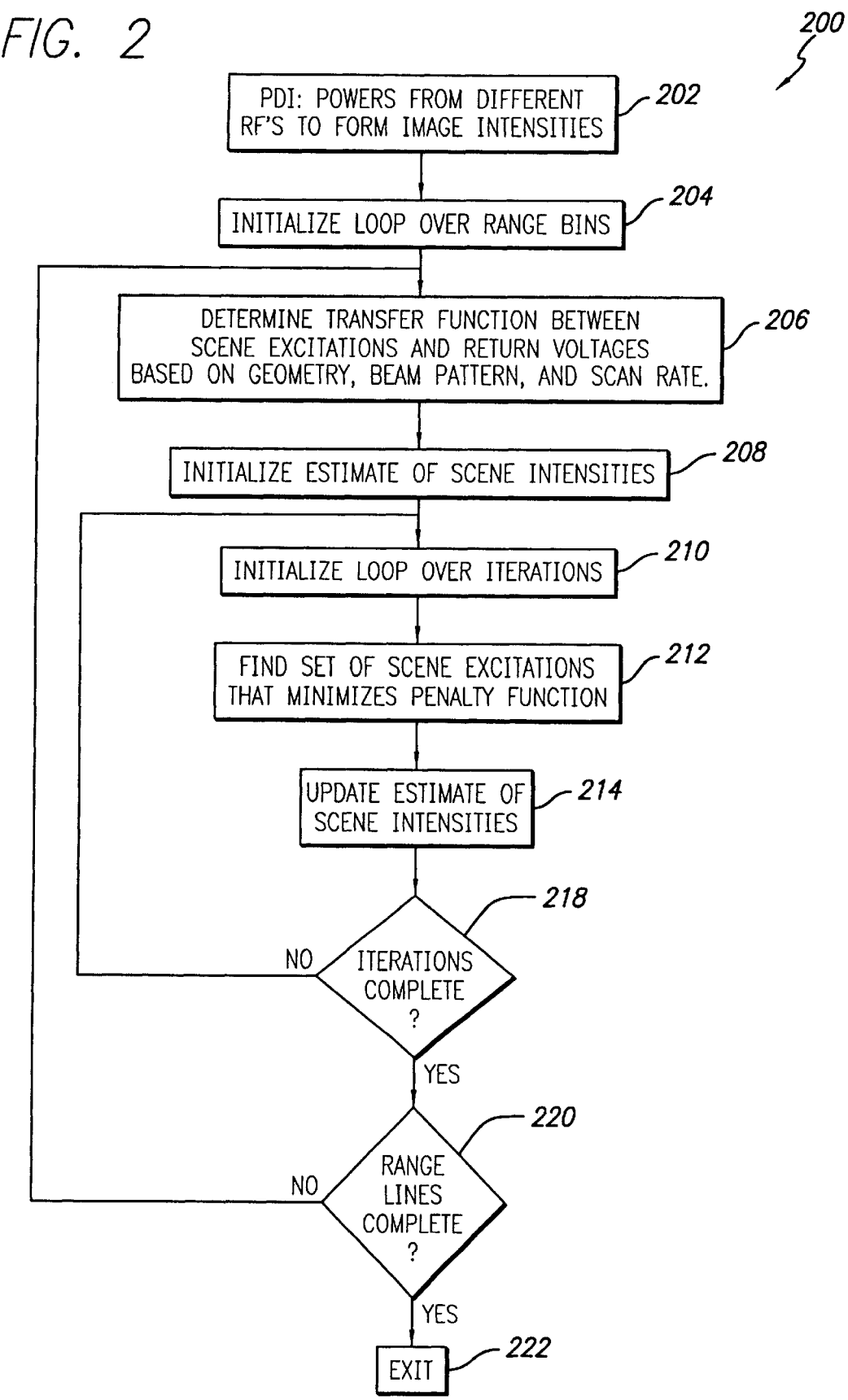
FIG. 2 is a flow diagram of an illustrative embodiment of the novel inverse filtering technique of the present invention.

FIG. 2 is a flow diagram of an illustrative embodiment of the novel sharpening technique of the present invention. The inventive method 200 includes the step 202 of performing a noncoherent (magnitude) pulse detection integration over several radar returns to provide an intensity for each range cell at each beam position while the transmit beam is hopping in frequency. (RF agility has been employed to reduce scintillation in the PDId image.) This yields an image, which is smeared in the cross-range direction as illustrated in FIG. 3.

Figure 3:
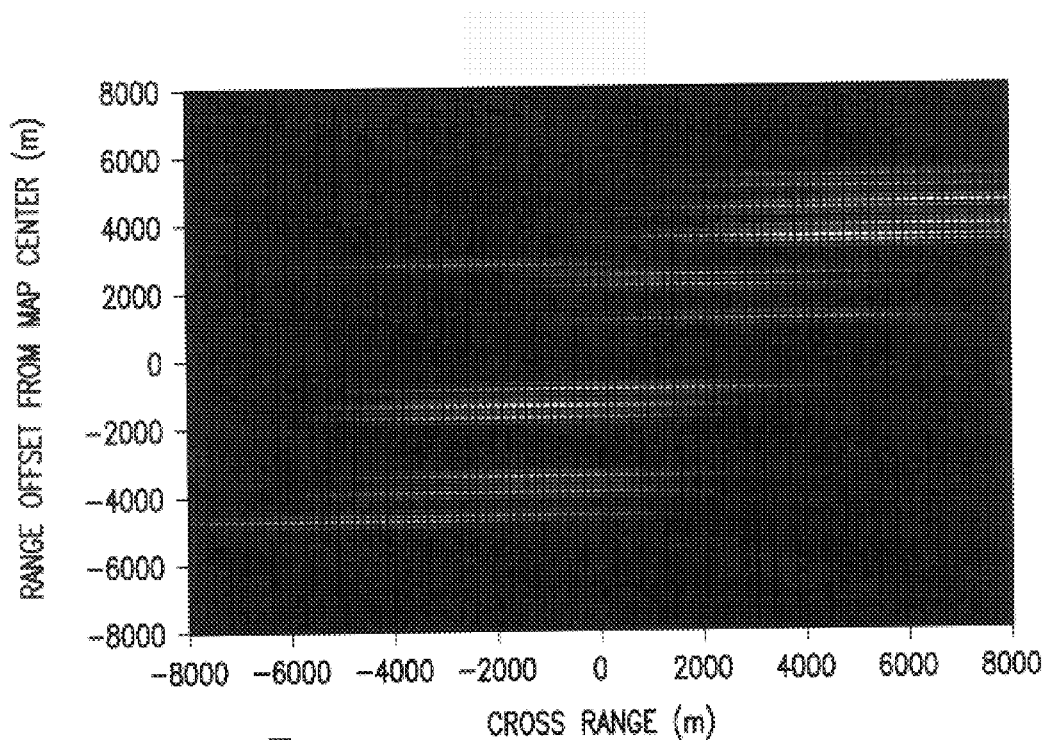
FIG. 3 is a diagram of an illustrative simulated real beam radar ground map image showing range offset versus cross-range for several scatterers having different spacing.

FIG. 3 is a diagram of an illustrative simulated real beam radar ground map image showing range offset versus cross-range for several scatterers having different spacing. The image smearing is clearly visible.

Returning to FIG. 2, next, at step 206, at each range bin or range cell, the system 100 determines a transfer function between scene excitations and return voltage based on geometry, beam pattern and/or scan rate. For example, with a mechanically scanned antenna, the transfer function relating the return voltage at beam position i to the scene excitation at azimuth location k is given by:

$$A_{ik}=g^2(azs_i-azb_k els_i-elb_k) \qquad [3]$$

where: $g^2$ (az,el) is the two-way antenna voltage gain function of azimuth and elevation relative to the antenna boresight.

Returning to FIG. 2, at step 208, the scene intensities are initialized to the power (absolute square of the voltage) recorded at each beam position for the range bin, averaged across RFs. If there are more azimuth pixels in the final image than beam positions, the initial scene intensities are generated by interpolation. Next, at step 212, for each iteration, the system 100 finds a set of complex scene excitations that minimizes the penalty function. At step 214, the estimates of the scene intensities are updated based on the absolute square of the excitations. Steps 212–214 are repeated for each iteration and steps 206–214 are repeated for each range bin until a reasonably low penalty function is achieved. Those of ordinary skill in the art will be able to select a threshold suitable for a given application without undue experimentation.

Since the technique is iterative, high throughput processing (e.g., 10 KFLOP per pixel) is required. The processing requirements may be met by currently available signal processors.

Figure 4:
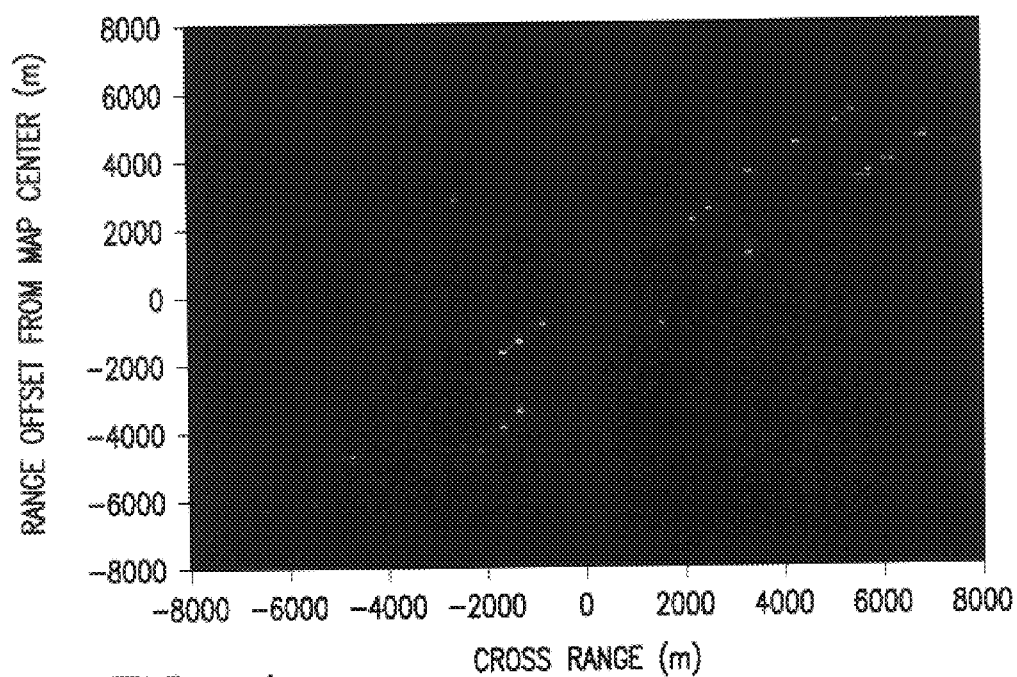
FIG. 4 is a diagram of an illustrative simulated real beam radar ground map image showing range offset versus cross-range for several scatterers having different spacing with a sharpened radar real beam image after a predetermined (e.g., five) iterations utilizing a system implemented accordance with the present teachings.

FIG. 4 is a diagram of an illustrative simulated real beam radar ground map image showing range offset versus cross-range for several scatterers having different spacing with a sharpened radar real beam image after a predetermined (e.g., five) iterations utilizing a system implemented accordance with the present teachings. Note that the smearing has been virtually eliminated and the radar scatterers are clearly discriminated and localized.

Returning to FIG. 1, the processor 116 receives aircraft kinematic data from an onboard inertial measurement unit (IMU) 118. The processor 116 commands a radar timing and control unit 120 which, in turn, drives the exciter/waveform generator 102 and the modulator 106 in a conventional manner. The processor 116 also provides signals to a user interface 122.

Thus, the present invention has been described herein with reference to a particular embodiment for a particular application. Those having ordinary skill in the art and access to the present teachings will recognize additional modifications applications and embodiments within the scope thereof. For example, the inventive technique is also applicable to SAR and Doppler Beam Sharpened images for enhanced target location, tracking, and identification.

It is therefore intended by the appended claims to cover any and all such applications, modifications and embodiments within the scope of the present invention.

Accordingly,
What is claimed is:

1. A system for processing image data comprising:
    means for providing a transfer function between scene excitations and voltage returns based on geometry, beam pattern and/or scan rate,
    means for ascertaining a set of scene excitations that minimize a penalty function of said transfer function, and
    means for ascertaining a set of scene intensities based on the scene excitations, and a set of optimal weights for said penalty function based on the scene intensities.

2. The invention of claim 1 wherein said transfer function is, for example, with a mechanically scanned antenna, relating the return voltage at beam position i to the scene excitation at azimuth location k is given by:

$$A_{ik}=g^2(azs_i-azb_k els_i-elb_k) \quad [3]$$

where: $g^2$ (az,el) is the two-way antenna voltage gain function of azimuth and elevation relative to the antenna boresight.

3. The invention of claim 1 wherein said penalty function is a sum of a square of errors between hypothesized scene excitations convolved with an antenna pattern and return voltages.

4. An imaging system including:
    means for illuminating a target with a beam of electromagnetic energy, said beam scanning in a cross-range direction and
    means for receiving reflections of said beam as return data said means for receiving including software and a processor for executing said software, said software including code for providing a transfer function between scene intensities and return voltages in said image data based on geometry, beam pattern and/or scan rate and code for ascertaining a set of scene excitations that minimize a penalty function of said transfer function.

5. The invention of claim 4 wherein said means for illuminating includes a radar transmitter.

6. The invention of claim 4 wherein said means for receiving includes a radar receiver.

7. The invention of claim 4 wherein said software further includes means for ascertaining a set of scene intensities based on the scene excitations and a set of optimal weights for said penalty function based on the scene intensities.

* * * * *